US009065522B2

(12) United States Patent  
Xu (10) Patent No.: US 9,065,522 B2  
(45) Date of Patent: Jun. 23, 2015

(54) RADIO FREQUENCY FRONT-END MODULE, AND RADIO ACCESS NETWORK DEVICE AND CONTROL METHOD

(71) Applicant: Huawei Technologies Co., Ltd., Shenzhen (CN)

(72) Inventor: Xiangen Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 252 days.

(21) Appl. No.: 13/860,794

(22) Filed: Apr. 11, 2013

(65) Prior Publication Data

US 2013/0288607 A1    Oct. 31, 2013

(30) Foreign Application Priority Data

Apr. 13, 2012   (CN) .......................... 2012 1 0107799

(51) Int. Cl.
| | | |
|---|---|---|
| *H04W 72/00* | (2009.01) | |
| *H04B 7/12* | (2006.01) | |
| *H01Q 21/00* | (2006.01) | |
| *H01Q 21/22* | (2006.01) | |
| *H01Q 3/26* | (2006.01) | |
| *H04B 1/04* | (2006.01) | |

(52) U.S. Cl.
CPC .............. *H04B 7/12* (2013.01); *H01Q 21/0087* (2013.01); *H01Q 21/22* (2013.01); *H01Q 3/26* (2013.01); *H04B 1/0458* (2013.01)

(58) Field of Classification Search
USPC .......... 455/42, 114.1, 115.1, 550.1, 419, 440, 455/63.4, 562.1, 446, 79, 73, 453; 340/10.1, 10.3, 572.1; 342/372, 17, 342/174, 383, 149, 368, 374, 357.34, 342/357.52

See application file for complete search history.

(56) References Cited

U.S. PATENT DOCUMENTS 5,818,385 A * 10/1998 Bartholomew ................ 342/372  
8,340,110 B2 * 12/2012 Gast .............................. 370/412

(Continued)

FOREIGN PATENT DOCUMENTS

KR      20080053188 A     6/2008  
WO      WO 99/54960 A2    10/1999

OTHER PUBLICATIONS

Extended European Search Report issued in corresponding European Patent Application No. 13163311.7, mailed Jul. 22, 2013, 6 pages.

(Continued)

*Primary Examiner* — Ganiyu A Hanidu  
(74) *Attorney, Agent, or Firm* — Brinks Gilson & Lione (57) ABSTRACT

The present invention provides a radio frequency front-end module, and a radio access network device and a control method thereof. The radio frequency front-end module includes a phase-shifting and attenuating unit, a radio frequency unit, and an antenna, where the radio frequency unit is respectively connected to the phase-shifting and attenuating unit and the antenna; the phase-shifting and attenuating unit is configured to receive a control signal and a radio frequency signal sent by a radio access network device and perform phase-shifting processing, or attenuating processing, or phase-shifting and attenuating processing on the radio frequency signal according to the control signal. The technical solution according to the embodiments of the present invention can be used to implement an operation mode of an intelligent antenna having multiple antennas cooperating with each other.

12 Claims, 3 Drawing Sheets

(56) References Cited

U.S. PATENT DOCUMENTS

2004/0069852 A1* 4/2004 Seppinen et al. ............ 235/451
2007/0080787 A1* 4/2007 Taki et al. .................... 340/10.1
2008/0079541 A1* 4/2008 Rofougaran ................. 340/10.1
2012/0252382 A1* 10/2012 Bashir et al. ............... 455/114.3
2013/0225101 A1* 8/2013 Basaran et al. ................ 455/79

OTHER PUBLICATIONS

Zhensong et al., "Studies on the Active Phased Array of Space-Borne Synthetic Aperture Radar" vol. 25, No. 5, May 2003.

* cited by examiner

RADIO FREQUENCY FRONT-END MODULE, AND RADIO ACCESS NETWORK DEVICE AND CONTROL METHOD

CROSS-REFERENCE TO RELATED APPLICATION

This application claims priority to Chinese Patent Application No. 201210107799.5, filed on Apr. 13, 2012, which is hereby incorporated by reference in its entirety.

FIELD

Embodiments of the present invention relate to the field of communication technologies, and in particular, to a radio frequency front-end module, and a radio access network device and a control method thereof.

BACKGROUND

At present, network service providers are making great efforts to promote a plan of digital city. However, because the $3^{rd}$ generation (3rd-generation, 3G) mobile communication cannot meet the requirements of future mass wireless network applications, network service providers are currently promoting wireless local area network (Wireless Local Area Network; WLAN) based on the wireless fidelity (Wireless Fidelity; WIFI) technology as an effective supplement to the 3rd-generation (3rd-generation, 3G) mobile communication, which finally renders a situation of wireless network services with WLAN and 3G supplementing each other. In this case, a user may see two types of base station devices in the future: a currently common large-scale and high-power 3G mobile base station and a WLAN access point (Access Point; AP) which is hardly noticeable. The WLAN AP, compared with the 3G mobile base station, is small and easy for deployment and installation, has a small power, and may also be referred to as a WLAN micro base station.

A radio access network device such as a WLAN AP normally includes a control module, a radio frequency module, and an antenna, where the control module thereof is provided with a central processing unit (Central Processing Unit; CPU) and is written with corresponding control software for implementing corresponding functions thereof. In an existing radio access network device, the control module, radio frequency module, and antenna are normally set together, and for example, may be welded on the same circuit board generally.

During the implementation of the present invention, the inventor finds that the prior art has at least the following problems: In the radio access network device in the prior art, the control module, radio frequency module, and antenna are generally set on one circuit board to form an integral structure, and the device has a large volume and a high cost. Once the radio access network device is set up, the performances thereof in various aspects cannot be changed. For example, once the radiation pattern of the antenna is determined, it cannot be changed. Therefore the operation mode of an intelligent antenna cannot be implemented.

SUMMARY

Embodiments of the present invention provide a radio frequency front-end module, and a radio access network device and a control method thereof, thereby providing an operation mode of an intelligent antenna having multiple antennas cooperating with each other.

An embodiment of the present invention provides a radio frequency front-end module, including a phase-shifting and attenuating unit, a radio frequency unit, and an antenna, where the radio frequency unit is respectively connected to the phase-shifting and attenuating unit and the antenna;

the phase-shifting and attenuating unit is configured to receive a control signal and a radio frequency signal sent by a radio access network device, and perform phase-shifting processing, or attenuating processing, or phase-shifting and attenuating processing on the radio frequency signal according to the control signal;

the radio frequency unit is configured to perform radio frequency amplification processing on the radio frequency signal processed by the phase-shifting and attenuating unit; and the antenna is configured to transmit the radio frequency signal processed by the radio frequency unit.

An embodiment of the present invention further provides a radio access network device, including a control module, a frequency conversion module, and at least two radio frequency front-end modules, where the radio frequency front-end module includes a phase-shifting and attenuating unit and an antenna, and the antennas in the at least two radio frequency front-end modules form an antenna array;

the control module is configured to respectively send a control signal to the phase-shifting and attenuating units in the at least two radio frequency front-end modules when a radiation pattern of the antenna array needs to be changed; and the phase-shifting and attenuating unit is configured to receive the control signal sent by the control module and a radio frequency signal sent by the frequency conversion module, and perform phase-shifting processing, or attenuating processing, or phase-shifting and attenuating processing on the radio frequency signal according to the control signal sent by the control module, thereby changing the radiation pattern of the antenna array.

An embodiment of the present invention further provides a method for controlling a radio access network device, where the radio access network device includes a control module, a frequency conversion module, and at least two radio frequency front-end modules; the radio frequency front-end module includes a phase-shifting and attenuating unit and an antenna; the antennas in the at least two radio frequency front-end modules form an antenna array; and the control method includes:

respectively sending, by the control module, a control signal to the phase-shifting and attenuating units in the at least two radio frequency front-end modules when a radiation pattern of the antenna array needs to be changed; and respectively receiving, by the phase-shifting and attenuating units of the at least two radio frequency front-end modules, the control signal sent by the control module and a radio frequency signal sent by the frequency conversion module, and respectively performing phase-shifting processing, or attenuating processing, or phase-shifting and attenuating processing on the radio frequency signal according to the control signal sent by the control module, thereby changing the radiation pattern of the antenna array.

The radio frequency front-end module, and the radio access network device and the control method thereof according to the embodiments of the present invention, by using the foregoing technical solutions according to the embodiments of the present invention, are capable of implementing phase-shifting processing, or attenuating processing, or phase-shifting and attenuating processing on a radio frequency signal sent by a frequency conversion module, so that a radiation pattern of an antenna is changed, thereby implementing an operation mode of an intelligent antenna having multiple antennas cooperating with each other.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more clear, the following describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
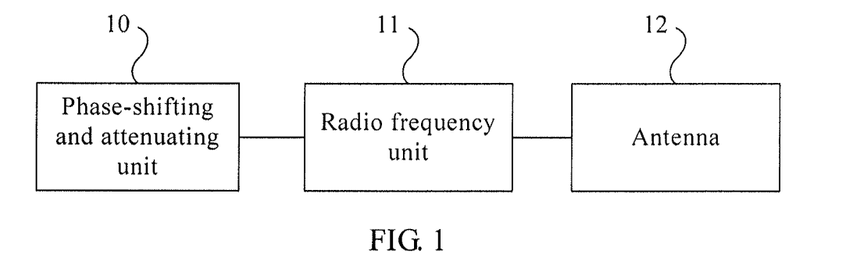
FIG. 1 is a schematic structural diagram of a radio frequency front-end module according to an embodiment of the present invention.

FIG. 1 is a schematic structural diagram of a radio frequency front-end module according to an embodiment of the present invention. As shown in FIG. 1, in this embodiment, the radio frequency front-end module includes a phase-shifting and attenuating unit 10, a radio frequency unit 11, and an antenna 12. The radio frequency unit 11 is respectively connected to the phase-shifting and attenuating unit 10 and the antenna 12.

In this embodiment, the phase-shifting and attenuating unit 10 in the radio frequency front-end module is configured to receive a control signal and a radio frequency signal sent by a radio access network device, and perform phase-shifting processing, or attenuating processing, or phase-shifting and attenuating processing on the radio frequency signal according to the control signal. For example, in some cases, only the phase-shifting processing needs to be performed; in such cases, an attenuation amount to be adjusted in the control signal is 0. In some cases, only the attenuating processing needs to be performed: in such cases, a phase-shifting amount to be adjusted in the control signal is 0. In some cases, not only the phase-shifting processing but also the attenuating processing need to be performed; in such cases, the control signal includes not only a phase-shifting amount to be adjusted but also an attenuating amount to be adjusted.

The radio frequency unit 11 is configured to perform radio frequency amplification processing on the radio frequency signal processed by the phase-shifting and attenuating unit 10. The antenna 12 is configured to transmit the radio frequency signal processed by the radio frequency unit 11.

In this embodiment, the phase-shifting and attenuating unit 11 may be implemented by using a phase shifter and an attenuator.

In the technical solution of this embodiment, because a phase-shifting and attenuating unit 10 is set, a radio frequency signal on which phase-shifting processing, or attenuating processing, or phase-shifting and attenuating processing has been performed, is performed with radio frequency amplification processing by a radio frequency unit 11, and the phase, or amplitude, or phase and amplitude are changed when the radio frequency signal is transmitted by an antenna 12, thereby implementing an operation mode of an intelligent antenna having multiple antenna cooperating with each other.

It should be noted that, in the foregoing embodiment, the phase-shifting and attenuating unit 10, the radio frequency unit 11, and the antenna 12 may be set on the same circuit board as a whole, which is convenient for using.

Figure 2:
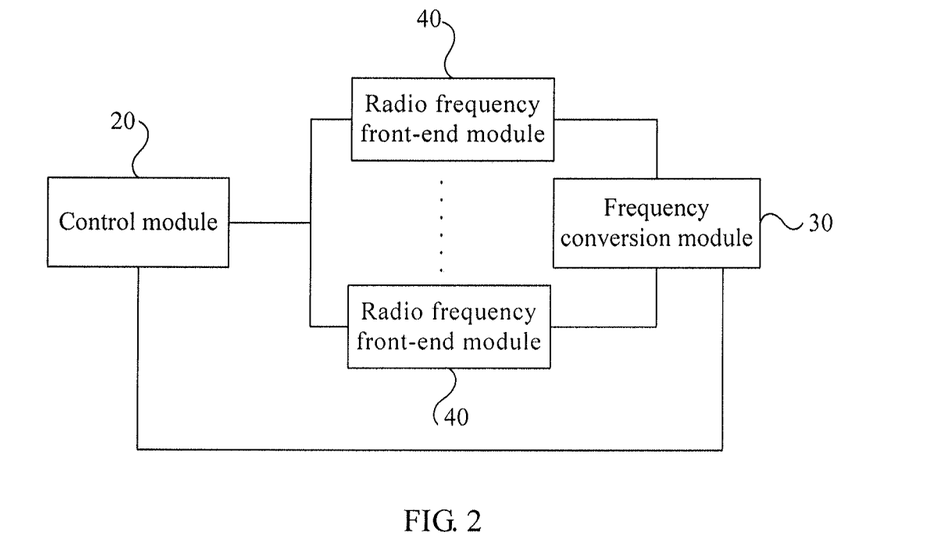
FIG. 2 is a schematic structural diagram of a radio access network device according to an embodiment of the present invention.

FIG. 2 is a schematic structural diagram of a radio access network device according to an embodiment of the present invention. As shown in FIG. 2, in this embodiment, the radio access network device includes a control module 20, a frequency conversion module 30, and at least two radio frequency front-end modules 40. The radio frequency front-end module 40 includes a phase-shifting and attenuating unit and an antenna, and the antennas in the at least two radio frequency front-end modules 40 form an antenna array. The control module 20 is configured to respectively send a control signal to the phase-shifting and attenuating units of the at least two radio frequency front-end modules 40 when a radiation pattern of the antenna array needs to be changed.

The phase-shifting and attenuating unit is configured to receive the control signal sent by the control module 20 and a radio frequency signal sent by the frequency conversion module 30, and perform phase-shifting processing, or attenuating processing, or phase-shifting and attenuating processing on the radio frequency signal according to the control signal sent by the control module 20, thereby changing the radiation pattern of the antenna array. For example, each radio frequency front-end module 40 includes a phase-shifting and attenuating unit and an antenna; the at least two radio frequency front-end modules 40 include at least two antennas in total, and the at least two antennas form an antenna array. The control signal sent by the control module 20 to phase-shifting and attenuating unit of each radio frequency front-end module 40 of the at least two radio frequency front-end modules 40 may be the same or different. For example, the magnitude of the control signal sent to the phase-shifting and attenuating unit of each of the radio frequency front-end modules 40 may be specifically related to the degree of phase-shifting processing, or attenuating processing, or phase-shifting and attenuating processing to be performed on the radio frequency signal by the phase-shifting and attenuating unit in the radio frequency front-end module 40. Each phase-shifting and attenuating unit respectively performs phase-shifting processing, or attenuating processing, or phase-shifting and attenuating processing on the radio frequency signal, thereby changing the radiation pattern formed by the at least two antennas.

It should be noted that, in this embodiment, the radio frequency front-end module 40 in the radio access network device may further include a radio frequency unit configured to perform radio frequency amplification processing on the radio frequency signal. In the radio frequency front-end module 40, the radio frequency unit is respectively connected to the phase-shifting and attenuating unit and the antenna; the radio frequency unit is configured to perform radio frequency amplification processing on the radio frequency signal processed by the phase-shifting and attenuating unit; and the antenna is configured to transmit the radio frequency signal processed by the radio frequency unit.

Specifically, in this embodiment, the radio frequency front-end module 40 may specifically use the radio frequency front-end module according to the foregoing embodiment shown in FIG. 1. FIG. 2 does not show modules included in the radio frequency front-end module 40 in detail, and for details about these modules, reference may be made to the foregoing radio frequency front-end module shown in FIG. 1.

In this embodiment, the control module 20 is connected to the frequency conversion module 30. The control module 20, for example, a CPU, is capable of generating or receiving a baseband signal, and forwarding the baseband signal to the frequency conversion module 30. The frequency conversion module 30 is configured to perform a digital-to-analog conversion on the baseband signal, and then perform frequency conversion processing to change the baseband signal into a radio frequency signal. In this embodiment, the frequency conversion module 30 is further configured to respectively send a radio frequency signal to the phase-shifting and attenuating units of the at least two radio frequency front-end modules 40. The radio frequency signals sent to the phase-shifting and attenuating units of the radio frequency front-end modules 40 are the same.

By using the technical solution according to this embodiment, phase-shifting processing, or attenuating processing, or phase-shifting and attenuating processing may be implemented on a radio frequency signal, thereby changing a radiation pattern of an antenna, and implementing an operation mode of an intelligent antenna having multiple antennas cooperating with each other.

In the foregoing embodiment, the radio frequency front-end modules and the control module in the radio access network device are respectively set on different circuit boards. The radio frequency front-end modules are fabricated as a whole, and the control module may also be separately set as a whole. Compared with the prior art, in the technical solution according to the embodiment of the present invention, the radio frequency front-end modules and the control module are respectively set on different circuit boards, which can be implemented with circuit boards only having small sizes, thereby effectively reducing costs. In addition, in the embodiment of the present invention, the radio frequency front-end modules and the control module of the radio access network device all have small sizes. The radio frequency front-end modules may be deployed at any locations required by a user, thereby expanding the coverage area of a radio access network, and improving the capacity of the radio access network device for very convenient using. In addition, in this embodiment, one control module in the radio access network device may simultaneously control multiple radio frequency front-end modules, thereby effectively expanding the coverage areas of the radio access network device and the wireless data capacity, and implementing an operation mode of an intelligent antenna having multiple antennas cooperating with each other which is required by various services by using multiple radio frequency front-end modules.

Figure 3:
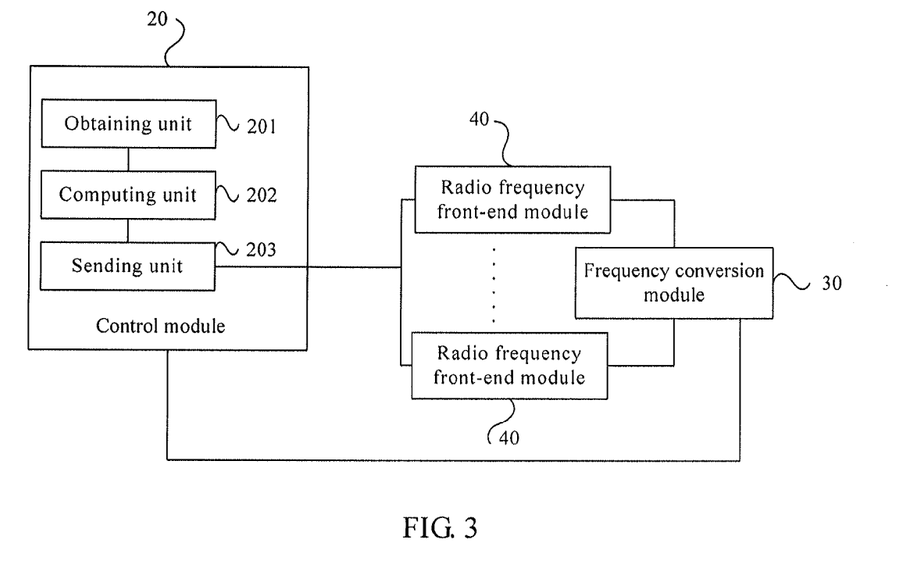
FIG. 3 is a schematic structural diagram of another radio access network device according to an embodiment of the present invention.

FIG. 3 is a schematic structural diagram of another radio access network device according to an embodiment of the present invention. As shown in FIG. 3, in this embodiment, the radio access network device also includes a control module 20, a frequency conversion module 30, and at least two radio frequency front-end modules 40, where the control module 20 includes an obtaining unit 201, a computing unit 202, and a sending unit 203. The radio access network device of this embodiment describes the technical solution of the present invention in more details on the basis of the foregoing embodiment shown in FIG. 2.

Optionally, the computing unit 202 is connected to the obtaining unit 201, and the sending unit 203 is connected to the computing unit 202. In such cases, the obtaining unit 201 is configured to obtain a location of the electromagnetic-enhanced device when a signal needs to be enhanced for an electromagnetic-enhanced device and it is determined that a radiation pattern of an antenna array needs to be changed. The computing unit 202 is configured to compute a control signal to be sent to each radio frequency front-end module 40 of the at least two radio frequency front-end modules 40 according to the location of the electromagnetic-enhanced device which is obtained by the obtaining unit 201 and the location of each radio frequency front-end module 40 of the at least two radio frequency front-end modules. The sending unit 203 is configured to respectively send a corresponding control signal to the phase-shifting and attenuating units in the at least two radio frequency front-end modules 40.

The phase-shifting and attenuating unit in each radio frequency front-end module 40 is configured to receive the control signal sent by the sending unit 203 in the control module 20 and a radio frequency signal sent by the frequency conversion module 30, and perform phase-shifting processing, or attenuating processing, or phase-shifting and attenuating processing on the radio frequency signal according to the control signal, so that the signals sent by the at least two antennas in the at least two radio frequency front-end modules 40 are capable of providing enhanced coverage for the electromagnetic-enhanced device.

The control signals computed and obtained by the computing unit 202 and to be sent to each radio frequency front-end module 40 of the at least two radio frequency front-end modules may be the same or different. The sending unit 203 needs to send the control signal computed by the computing unit for each radio frequency front-end module 40 to the radio frequency front-end module 40. For example, the computing unit 202 computes and obtains a control signal a to be sent to a first radio frequency front-end module 40, and computes and obtains a control signal b to be sent to a second radio frequency front-end module 40; in such cases, the control signal a needs to be sent to the first radio frequency front-end module 40, and the control signal b needs to be sent to the second radio frequency front-end module 40 respectively. The control signal a and the control signal b may be the same or different.

Correspondingly, the phase-shifting and attenuating unit of each of the radio frequency front-end modules 40 only receives the control signal corresponding to the radio frequency front-end module 40 and sent by the sending unit 203; the phase-shifting and attenuating unit also receives the radio frequency signal corresponding to the radio frequency front-end module 40 and sent by the frequency conversion module 30, and performs phase-shifting processing, or attenuating processing, or phase-shifting and attenuating processing on the radio frequency signal according to the control signal, thereby changing the phase, or amplitude, or phase and amplitude of the radio frequency signal transmitted by the antenna in the radio frequency front-end module 40. When at least two radio frequency front-end modules 40 work at the same time, the signals sent by the antennas in the at least two radio frequency front-end modules 40 are capable of providing enhanced coverage for the electromagnetic-enhanced device, thereby enhancing the signal strength of the electromagnetic-enhanced device to the maximum. In addition, the radio access network device is ensured to work stably and reliably, thereby effectively and reasonably using the signal transmission energy.

Figure 4:
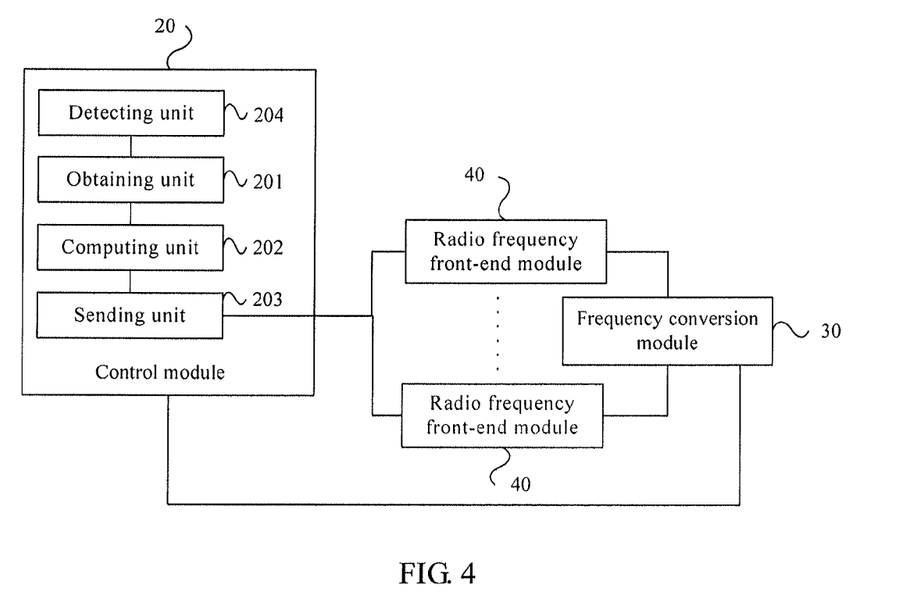
FIG. 4 is a schematic structural diagram of still another radio access network device according to an embodiment of the present invention.

FIG. 4 is a schematic structural diagram of still another radio access network device according to an embodiment of the present invention. As shown in FIG. 4, in the radio access network device of this embodiment, on the basis of the embodiment shown in FIG. 3, the control module 20 may further include a detecting unit 204, where the obtaining unit 201 is connected to the detecting unit 204.

The detecting unit 204 is configured to detect whether the radio frequency signal sent by the antenna array of the radio access network device is electromagnetically interfered.

Correspondingly, the obtaining unit 201 is configured to obtain a location of an electromagnetic-interfering device which electromagnetically interferes with the radio access network device when the radio frequency signal sent by the antenna array of the radio access network device is electromagnetically interfered and it is determined that the radiation pattern of the antenna array needs to be changed. The computing unit 202 is configured to respectively compute a control signal to be sent to each radio frequency front-end module 40 of the at least two radio frequency front-end modules according to the location of the electromagnetic-interfering device obtained by the obtaining unit 201 and the location of each radio frequency front-end module of the at least two radio frequency front-end modules. The computing method may be an existing beamforming algorithm of an antenna array, and will not be repeated herein any further.

The sending unit 203 is configured to respectively send a corresponding control signal computed by the computing unit 202 to the phase-shifting and attenuating unit in each radio frequency front-end module 40 of the at least two radio frequency front-end modules.

The phase-shifting and attenuating unit is configured to receive the control signal sent by the sending unit 203 and a radio frequency signal sent by the frequency conversion module 30, and perform phase-shifting processing, or attenuating processing, or phase-shifting and attenuating processing on the radio frequency signal according to the control signal, so that the radio frequency signals sent by the antennas in the at least two radio frequency front-end modules are capable of performing beam null-forming on the electromagnetic-interfering device, that is, the radiation pattern of the antenna array formed by at least two antennas is changed.

The control signal computed and obtained by the computing unit 202 and to be sent to each radio frequency front-end module 40 may be the same or different. For example, the computing unit 202 computes and obtains a control signal a to be sent to a first radio frequency front-end module 40, and computes and obtains a control signal b to be sent to a second radio frequency front-end module 40; in such cases, the control signal a needs to be sent to the first radio frequency front-end module 40, and the control signal b needs to be sent to the second radio frequency front-end module 40 respectively. The control signal a and the control signal b may be the same or different. When at least two radio frequency modules 40 cooperate to work at the same time, at least two antennas cooperate with each other to form an intelligent antenna. Because the radio frequency front-end module 40 uses a phase-shifting and attenuating unit, the phase, or amplitude, or phase and amplitude of the radio frequency signals sent by the antennas may be changed, that is, the radiation pattern of the antenna array formed by the at least two antennas is changed. Because at least two antennas work together, the transmitted signals are capable of performing beam null-forming on the electromagnetic-interfering device, thereby reducing the interference of the electromagnetic-interfering device to the maximum. In addition, the radio access network device is ensured to work stably and reliably, thereby effectively and reasonably using the signal transmission energy.

In the foregoing embodiment, the radio access network device uses the radio frequency front-end modules to change the radiation pattern of the antennas, thereby implementing an operation mode of an intelligent antenna having multiple antennas cooperating with each other.

In the embodiment of the present invention, the radio access network device is very convenient to use, and the control module of the radio access network device may be set with multiple ports for connecting to multiple radio frequency front-end modules. For example, the following application scenarios may be included:

First scenario: When a customer requires wireless coverage in a room which is not required before, a combination cable configured to connect a control module and a radio frequency front-end module of a radio access network device may be deployed in the room, and the radio frequency front-end module may be directly plugged to achieve the wireless coverage. When the wireless coverage of the customer's room is no longer required, it is only necessary to unplug the radio frequency front-end module and close signal access (that is, disable a port on the control module for connecting to the radio frequency front-end module).

Second scenario: A customer already has wireless coverage in a room, but capacity expansion is required as wireless users increase. In such cases, a position may be selected after actually testing the room environment to add a radio frequency front-end module, thereby adding a radio frequency access point; and relevant software on a small-size central device is used to modify controls and data flow processing, so that several radio frequency front-end modules operate in a multiple-input multiple-output (Multiple-Input Multiple-Out-put; MIMO) mode, thereby expanding the transmission rate capacity to the maximum.

Third scenario: When a customer needs to add another electromagnetic device in a room, which causes electromagnetic interference to wireless access, phase and attenuation control are performed on several radio frequency front-end modules in the room through software control of a small-size central device, so as to change the construction of an antenna beam, and perform beam null-forming on the electromagnetic-interfering points of the electromagnetic device, thereby implementing an operation mode of an intelligent antenna having multiple antennas cooperating with each other.

Fourth scenario: When a customer needs to obtain a wireless access device having enhanced coverage, the customer only needs to combine and configure several radio frequency front-end modules to achieve enhanced coverage, and no component reselection or redesign is required.

Fifth scenario: When the performance is affected by polarization, it is only necessary to rotate a radio frequency front-end module by 90 degrees, or add an active antenna module perpendicular to the radio frequency front-end module beside the radio frequency front-end module.

The foregoing scenarios are merely some examples. In real applications, settings may be made according to actual situations to use the radio access network device of this embodiment to implement the operation mode of an intelligent antenna.

It should be noted that, in the foregoing embodiments, the radio access network device may specifically be a WLAN AP device.

The foregoing described apparatus embodiment is merely exemplary. The units described as separate parts may or may not be physically separated, and parts displayed as units may or may not be physical units, may be located in one position, or may be distributed on at least two network units. A part of or all of the modules may be selected according to the actual needs to achieve the objectives of the solutions of the embodiments. Persons of ordinary skill in the art may understand and implement the embodiments without creative efforts.

Figure 5:
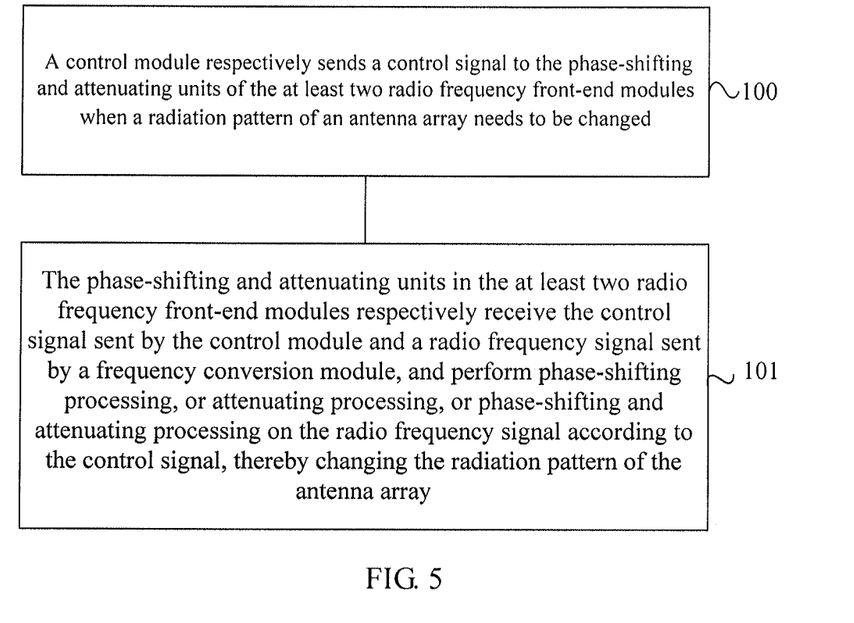
FIG. 5 is a flowchart of a method for controlling a radio access network device according to an embodiment of the present invention.

FIG. 5 is a flowchart of a method for controlling a radio access network device according to an embodiment of the present invention. In this embodiment, the radio access network device includes a control module, a frequency conversion module, and at least two radio frequency front-end modules, where the radio frequency front-end module includes a phase-shifting and attenuating unit and an antenna, and the antennas in the at least two radio frequency front-end modules form an antenna array. As shown in FIG. 5, in this embodiment, the method for controlling the radio access network device may specifically include:

100. A control module respectively sends a control signal to the phase-shifting and attenuating units of the at least two radio frequency front-end modules when a radiation pattern of an antenna array needs to be changed.

Specifically, the control module sends the control signal respectively to the phase-shifting and attenuating unit in each radio frequency front-end module of the at least two radio frequency front-end modules. For example, when the radio access network device includes two radio frequency front-end modules A and B, the control module sends a control signal a to the radio frequency front-end module A, and sends a control signal b to the radio frequency front-end module B, where the control signal a and the control signal b may be the same or different.

101. The phase-shifting and attenuating units in the at least two radio frequency front-end modules respectively receive the control signal sent by the control module and a radio frequency signal sent by the frequency conversion module, and perform phase-shifting processing, or attenuating processing, or phase-shifting and attenuating processing on the radio frequency signal according to the control signal, thereby changing the radiation pattern of the antenna array.

Optionally, in the foregoing 100, the respectively sending, by the control module, the control signal respectively to the phase-shifting and attenuating units of the at least two radio frequency front-end modules when the radiation pattern of the antenna array needs to be changed may specifically include:

200. detecting, by the control module, whether a radio frequency signal sent by the antenna array of the radio access network device is electromagnetically interfered;

201. obtaining a location of an electromagnetic-interfering device which electromagnetically interferes with the radio access network device when the radio frequency signal sent by the antenna array is electromagnetically interfered and the control module determines that the radiation pattern of the antenna array needs to be changed;

202. respectively computing, by the control module, a control signal to be sent to each radio frequency front-end module of the at least two radio frequency front-end modules according to the location of the electromagnetic-interfering device and the location of each radio frequency front-end module of the at least two radio frequency front-end modules, where for the computing method, reference may be made to an existing beamforming algorithm of an antenna array, which will not be repeated herein any further; and 203. respectively sending, by the control module, a corresponding control signal to the phase-shifting and attenuating units of the at least two radio frequency front-end modules.

For example, in step 202, a control signal a to be sent to a radio frequency front-end module A is computed and obtained, and a control signal b to be sent to a radio frequency front-end module B is computed and obtained; hence, in step 203, the control module needs to send the control signal a to the radio frequency front-end module A, and send the control signal b to the radio frequency front-end module B, where the control signal a and the control signal b may be the same or different. Here, a radio access network device including two radio frequency front-end modules is used as an example. Similarly, the foregoing solution may be applied in a technical solution where a radio access network device includes multiple radio frequency front-end modules.

Correspondingly, in the foregoing 101, the respectively receiving, by the phase-shifting and attenuating units in the at least two radio frequency front-end modules, the control signal sent by the control module and the radio frequency signal sent by the frequency conversion module, and respectively performing phase-shifting processing, or attenuating processing, or phase-shifting and attenuating processing on the radio frequency signal according to the control signal, thereby changing the radiation pattern of the antenna array may specifically be: respectively receiving, by the phase-shifting and attenuating units in the at least two radio frequency front-end modules, the control signal sent by the control module and the radio frequency signal sent by the frequency conversion module, and performing phase-shifting processing, or attenuating processing, or phase-shifting and attenuating processing on the radio frequency signal according to the control signal, so that a radio frequency signal sent by the antenna array is capable of performing beam null-forming on the electromagnetic-interfering device.

Furthermore, optionally, in the foregoing 100, the respectively sending, by the control module, the control signal to the phase-shifting and attenuating units of the at least two radio frequency front-end modules when the radiation pattern of the antenna array needs to be changed may also specifically include;

300. when a signal needs to be enhanced for an electromagnetic-enhanced device, obtaining, by the control module, a location of the electromagnetic-enhanced device, where for example, the location of the electromagnetic-enhanced device may be manually determined, and be input into the control module by a staff using a human-machine interface module, so that the control module obtains the location;

301. respectively computing, by the control module, a control signal to be sent to each radio frequency front-end module of the at least two radio frequency front-end modules according to the location of the electromagnetic-enhanced device and the location of each radio frequency front-end module of the at least two radio frequency front-end modules; and 302. sending, by the control module, a corresponding control signal respectively to the phase-shifting and attenuating unit in each radio frequency front-end module of the at least two radio frequency front-end modules.

In 301, the control module may compute a control signal for each radio frequency front-end module, where the control signal is a control signal corresponding to the radio frequency front-end module. For example, the control module computes and obtains a corresponding control signal a to be sent to the radio frequency front-end module A, and a corresponding control signal b to be sent to the radio frequency front-end module B; hence in 302, the control module needs to send the corresponding control signal a to the radio frequency front-end module A, and send the corresponding control signal b to the radio frequency front-end module B, where the control signal a and the control signal b may be the same or different. Here, a radio access network device including two radio frequency front-end modules is used as an example. Similarly, the foregoing solution may be applied in a technical solution where a radio access network device includes multiple radio frequency front-end modules.

Correspondingly, in the foregoing 101, the respectively receiving, by the phase-shifting and attenuating units in the at least two radio frequency front-end modules, the control signal sent by the control module and the radio frequency signal sent by the frequency conversion module, and performing phase-shifting processing, or attenuating processing, or phase-shifting and attenuating processing on the radio frequency signal according to the control signal, thereby changing the radiation pattern of the antenna array may specifically be: respectively receiving, by the phase-shifting and attenuating units in the at least two radio frequency front-end modules, the control signal sent by the control module and the radio frequency signal sent by the frequency conversion module, and performing phase-shifting processing, or attenuating processing, or phase-shifting and attenuating processing on the radio frequency signal according to the control signal, so that the radio frequency signals sent by the at least two antennas in the at least two radio frequency front-end modules are capable of providing enhanced coverage for the electromagnetic-enhanced device.

In this embodiment, the radio access network device may specifically be the radio access network device in the embodiment shown in FIG. 2 or FIG. 3. In this embodiment, the method for controlling the radio access network device has the same operation principle as the foregoing radio access network device. For details, reference may be made to the description of the foregoing relevant embodiments, which will not be repeated herein any further.

The method for controlling a radio access network device according to this embodiment, by using the foregoing technical solutions, is capable of implementing phase-shifting processing, or attenuating processing, or phase-shifting and attenuating processing on a radio frequency signal, so that a radiation pattern of an antenna array formed by at least two antennas is changed, thereby implementing an operation mode of an intelligent antenna having multiple antennas cooperating with each other.

Persons of ordinary skill in the art may understand that, all or part of the steps in each of the foregoing method embodiments may be implemented by a program instructing relevant hardware. The program may be stored in a computer readable storage medium. When the program is run, the steps of the forgoing methods in the embodiments are performed. The storage medium includes any medium that is capable of storing program codes, such as a ROM, a RAM, a magnetic disk, or an optical disk.

Finally, it should be noted that, the foregoing embodiments are merely intended for describing the technical solutions of the present invention, rather than limiting the present invention. Although the present invention is described in detail with reference to the foregoing embodiments, persons of ordinary skill in the art should understand that, they may still make modifications to the technical solutions described in the foregoing embodiments, or make equivalent replacements to some or all the technical features thereof, and such modifications or replacement do not make corresponding technical solutions depart from the scope of the technical solutions of the embodiments of the present invention.

What is claimed is:

1. A radio access network device, comprising a control module, a frequency conversion module, and at least two radio frequency front-end modules, wherein the radio frequency front-end module comprises a phase-shifting and attenuating unit and an antenna, and the antennas in the at least two radio frequency front-end modules form an antenna array;

the control module is configured to respectively send a control signal to the phase-shifting and attenuating units in the at least two radio frequency front-end modules when a radiation pattern of the antenna array needs to be changed; and the phase-shifting and attenuating unit is configured to receive the control signal sent by the control module and a radio frequency signal sent by the frequency conversion module, and perform phase-shifting processing, or attenuating processing, or phase-shifting and attenuating processing on the radio frequency signal according to the control signal sent by the control module, thereby changing the radiation pattern of the antenna array wherein the respectively sending, by the control module, comprises:

detecting, by the control module, whether a radio frequency signal sent by the antenna array is electromagnetically interfered;

obtaining, by the control module, a location of an electromagnetic-interfering device which electromagnetically interferes with the radio access network device when the radio frequency signal sent by the antenna array is electromagnetically interfered and it is determined that the radiation pattern of the antenna array needs to be changed;

respectively computing, by the control module, a control signal to be sent to each radio frequency front-end module of the at least two radio frequency front-end modules according to the location of the electromagnetic-interfering device and locations of the at least two radio frequency front-end modules; and respectively sending, by the control module, a corresponding control signal to the phase-shifting and attenuating units of the at least two radio frequency front-end modules; and correspondingly, the respectively receiving, by the phase-shifting and attenuating units of the at least two radio frequency front-end modules, the control signal sent by the control module and a radio frequency signal sent by the frequency conversion module, and respectively performing phase-shifting processing, or attenuating processing, or phase-shifting and attenuating processing on the radio frequency signal according to the control signal sent by the control module, thereby changing the radiation pattern of the antenna array comprises:

respectively receiving, by the phase-shifting and attenuating units in the at least two radio frequency front-end modules, the control signal sent by the control module and the radio frequency signal sent by the frequency conversion module, and respectively performing phase-shifting processing, or attenuating processing, or phase-shifting and attenuating processing on the radio frequency signal according to the control signal sent by the control module, so that a radio frequency signal sent by the antenna array is capable of performing beam null-forming on the electromagnetic-interfering device.

2. The radio access network device of claim 1, further comprising:
a radio frequency unit configured to perform radio frequency amplification processing on the radio frequency signal processed by the phase-shifting and attenuating unit; and
wherein the antenna is configured to transmit the radio frequency signal processed by the radio frequency unit.

3. The radio access network device according to claim 1, wherein the control module comprises a detecting unit, an obtaining unit, a computing unit, and a sending unit;
the detecting unit is configured to detect whether a radio frequency signal sent by the antenna array of the radio access network device is electromagnetically interfered;
the obtaining unit is configured to obtain a location of an electromagnetic-interfering device which electromagnetically interferes with the radio access network device when the radio frequency signal sent by the antenna array of the radio access network device is electromagnetically interfered and it is determined that the radiation pattern of the antenna array needs to be changed;
the computing unit is configured to respectively compute a control signal to be sent to each radio frequency front-end module of the at least two radio frequency front-end modules according to the location of the electromagnetic-interfering device and locations of the at least two radio frequency front-end modules;
the sending unit is configured to respectively send a corresponding control signal to the phase-shifting and attenuating units in the at least two radio frequency front-end modules; and
correspondingly, the phase-shifting and attenuating unit is specifically configured to receive the control signal sent by the sending unit and the radio frequency signal sent by the frequency conversion module, and perform phase-shifting processing, or attenuating processing, or phase-shifting and attenuating processing on the radio frequency signal according to the control signal sent by the sending unit, so that a radio frequency signal sent by the antenna array is capable of performing beam null-forming on the electromagnetic-interfering device.

4. The radio access network device according to claim 1, wherein the control module comprises an obtaining unit, a computing unit, and a sending unit;
the obtaining unit is configured to obtain a location of the electromagnetic-enhanced device when a signal needs to be enhanced for an electromagnetic-enhanced device and it is determined that a radiation pattern of the antenna array needs to be changed;
the computing unit is configured to respectively compute a control signal to be sent to each radio frequency front-end module of the at least two radio frequency front-end modules according to the location of the electromagnetic-enhanced device and locations of the at least two radio frequency front-end modules;
the sending unit is configured to respectively send a corresponding control signal to the phase-shifting and attenuating units in the at least two radio frequency front-end modules; and
correspondingly, the phase-shifting and attenuating unit is specifically configured to receive the control signal sent by the sending unit and the radio frequency signal sent by the frequency conversion module, and perform phase-shifting processing, or attenuating processing, or phase-shifting and attenuating processing on the radio frequency signal according to the control signal sent by the sending unit, so that a radio frequency signal sent by the antenna array is capable of providing enhanced coverage for the electromagnetic-enhanced device.

5. The radio access network device according to claim 4, wherein the radio access network device is an access point device in a wireless local area network.

6. The radio access network device according to claim 4, wherein the radio frequency front-end module and the control module are set on different circuit boards.

7. The radio access network device according to claim 3, wherein the radio access network device is an access point device in a wireless local area network.

8. The radio access network device according to claim 3, wherein the radio frequency front-end module and the control module are set on different circuit boards.

9. The radio access network device according to claim 1, wherein the radio access network device is an access point device in a wireless local area network.

10. The radio access network device according to claim 1, wherein the radio frequency front-end module and the control module are set on different circuit boards.

11. A method for controlling a radio access network device, wherein the radio access network device comprises a control module, a frequency conversion module, and at least two radio frequency front-end modules; the radio frequency front-end module comprises a phase-shifting and attenuating unit and an antenna; the antennas in the at least two radio frequency front-end modules form an antenna array; and the control method comprises:
respectively sending, by the control module, a control signal to the phase-shifting and attenuating units in the at least two radio frequency front-end modules when a radiation pattern of the antenna array needs to be changed; and
respectively receiving, by the phase-shifting and attenuating units of the at least two radio frequency front-end modules, the control signal sent by the control module and a radio frequency signal sent by the frequency conversion module, and respectively performing phase-shifting processing, or attenuating processing, or phase-shifting and attenuating processing on the radio frequency signal according to the control signal sent by the control module, thereby changing the radiation pattern of the antenna array;
wherein the respectively sending, by the control module, the control signal respectively to the phase-shifting and attenuating units in the at least two radio frequency front-end modules when the radiation pattern of the antenna array needs to be changed specifically comprises:
detecting, by the control module, whether a radio frequency signal sent by the antenna array is electromagnetically interfered;
obtaining, by the control module, a location of an electromagnetic-interfering device which electromagnetically interferes with the radio access network device when the radio frequency signal sent by the antenna array is electromagnetically interfered and it is determined that the radiation pattern of the antenna array needs to be changed;
respectively computing, by the control module, a control signal to be sent to each radio frequency front-end module of the at least two radio frequency front-end modules according to the location of the electromagnetic-interfering device and locations of the at least two radio frequency front-end modules; and respectively sending, by the control module, a corresponding control signal to the phase-shifting and attenuating units of the at least two radio frequency front-end modules; and correspondingly, the respectively receiving, by the phase-shifting and attenuating units of the at least two radio frequency front-end modules, the control signal sent by the control module and a radio frequency signal sent by the frequency conversion module, and respectively performing phase-shifting processing, or attenuating processing, or phase-shifting and attenuating processing on the radio frequency signal according to the control signal sent by the control module, thereby changing the radiation pattern of the antenna array specifically comprises:

respectively receiving, by the phase-shifting and attenuating units in the at least two radio frequency front-end modules, the control signal sent by the control module and the radio frequency signal sent by the frequency conversion module, and respectively performing phase-shifting processing, or attenuating processing, or phase-shifting and attenuating processing on the radio frequency signal according to the control signal sent by the control module, so that a radio frequency signal sent by the antenna array is capable of performing beam null-forming on the electromagnetic-interfering device.

12. The method according to claim 11, wherein the respectively sending, by the control module, the control signal respectively to the phase-shifting and attenuating units in the at least two radio frequency front-end modules when the radiation pattern of the antenna array needs to be changed specifically comprises:

obtaining, by the control module, a location of the electromagnetic-enhanced device when a signal needs to be enhanced for an electromagnetic-enhanced device and it is determined that the radiation pattern of the antenna array needs to be changed;

respectively computing, by the control module, a control signal to be sent to each radio frequency front-end module of the at least two radio frequency front-end modules according to the location of the electromagnetic-enhanced device and locations of the at least two radio frequency front-end modules; and respectively sending, by the control module, a corresponding control signal to the phase-shifting and attenuating units of the at least two radio frequency front-end modules; and correspondingly, the respectively receiving, by the phase-shifting and attenuating units of the at least two radio frequency front-end modules, the control signal sent by the control module and a radio frequency signal sent by the frequency conversion module, and respectively performing phase-shifting processing, or attenuating processing, or phase-shifting and attenuating processing on the radio frequency signal according to the control signal sent by the control module, thereby changing the radiation pattern of the antenna array specifically comprises:

respectively receiving, by the phase-shifting and attenuating units in the at least two radio frequency front-end modules, the control signal sent by the control module and the radio frequency signal sent by the frequency conversion module, and respectively performing phase-shifting processing, or attenuating processing, or phase-shifting and attenuating processing on the radio frequency signal according to the control signal sent by the control module, so that a radio frequency signal sent by the antenna array is capable of providing enhanced coverage for the electromagnetic-enhanced device.

\* \* \* \* \*